T. GUIDRY.
BALING PRESS.
APPLICATION FILED FEB. 21, 1908.
899,666.
Patented Sept. 29, 1908.
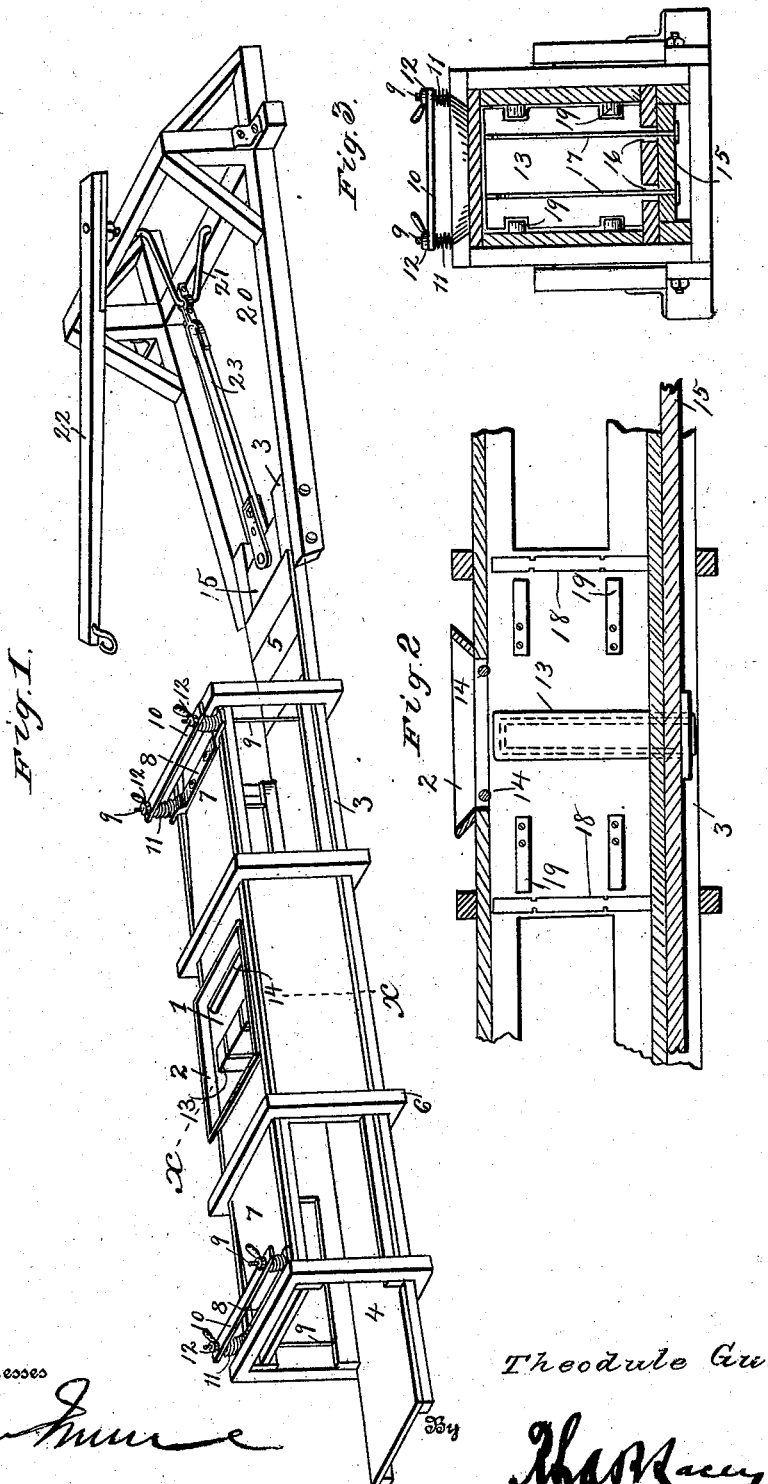
Inventor
Theodule Guidry.
Witnesses
By
Attorneys

UNITED STATES PATENT OFFICE.

THEODULE GUIDRY, OF CHURCH POINT, LOUISIANA.

BALING-PRESS.

No. 899,666.

Specification of Letters Patent.

Patented Sept. 29, 1908.

Application filed February 21, 1908. Serial No. 417,101.

*To all whom it may concern:*

Be it known that I, THEODULE GUIDRY, citizen of the United States, residing at Church Point, in the parish of Acadia and State of Louisiana, have invented certain new and useful Improvements in Baling-Presses, of which the following is a specification.

The purpose of the present invention is to devise a press for forming hay, straw and other loose material into bales, the purpose being to provide a double acting press of novel structure so that each stroke of the plunger may be utilized for effective work.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a perspective view of a double acting press embodying the invention. Fig. 2 is a vertical central longitudinal section of the baling chamber, the plunger operating mechanism and the mountings therefor being omitted. Fig. 3 is a transverse section on the line $x$—$x$ of Fig. 1.

Corresponding and like parts are referred to in the following description and indicated in all the views of the drawings by the same reference characters.

The baling chamber 1 is double ended and is provided at a central point with a feed opening 2 through which the hay, straw or other material is supplied to the baling chamber to be compressed. Longitudinal sills 3 support the baling chamber and project beyond the ends thereof to receive the platforms 4 and 5. Frames 6 embrace the four sides of the baling chamber and stiffen and strengthen the same. A portion of the top of the baling chamber near each end is made movable, as indicated at 7, the outer end of said movable portion being pressed inward so as to reduce the opening at the end of the baling chamber through which the bale is discharged, thereby retarding the delivery of the bale with the result that the same is compressed simultaneously with its discharge. A bar 8 is secured to the upper side of each movable portion 7 near the extremity thereof and its ends are off-set and extend over the sides of the baling chamber and receive rods 9. A bar 10 is mounted upon the upper ends of the rods 9 and coil springs 11 are placed upon the rods 9 and confined between the parts 8 and 10. Set nuts 12 threaded upon the projecting ends of the rods 9 regulate the tension of the springs 11 and admit of varying the resistance of the movable portion 7 of the baling chamber to the outward pressure of the bale as the latter is discharged.

The plunger 13 mounted to reciprocate in the baling chamber, is arranged so as to move across the feed opening 2, thereby admitting of a quantity of material being supplied to the baling chamber upon either side of the plunger, whereby the latter performs compressive work at each stroke. To prevent binding of the plunger, anti-friction rollers 14 are located upon each side of the feed opening 2 and about in line with the inner side of the top of the baling chamber. The plunger is connected at its lower end with a slide 15 which is mounted in guides below the bottom of the baling chamber, said bottom having longitudinal slots 16 through which connections 17 pass and join the plunger to said slide. The connections 17 may be of any substantial structure to enable the plunger to withstand the strain to which subjected when in operation.

Follow blocks 18 separate the bales and when advanced in the baling chamber are prevented from rearward movement by means of catches 19, the latter being applied to opposite sides of the baling chamber and being spring actuated so as to yield and admit of the follow blocks passing by them, but which spring outward and engage with the follow blocks after the latter have cleared the catches in their forward movement.

A framework 20 is connected to one end of the longitudinal sills 3 and supports a vertically arranged crank shaft 21 to the upper end of which is fitted a sweep 22, a pitman 23 connecting the crank with a slide 15. As the crank shaft is rotated by means of the sweep 22, the slide 15 is reciprocated, thereby moving the plunger 13 backward and forward in the baling chamber and alternately pressing the material in the end baling compartments thereof. By having the slide 15 arranged below the bottom of the baling chamber and beneath the platforms 4 and 5, it does not interfere in the least with the bales or the operator when standing upon the platform.

It is proposed to arrange the baling chamber horizontally and for convenience of transportation it may be mounted upon a running gear, the latter being of any construction to admit of transporting the press from one place to another.

Having thus described the invention, what is claimed as new is:

In a press, the combination of a double ended baling chamber having a centrally disposed feed opening, platforms at opposite ends of the baling chamber and about in the plane of the bottom thereof, movable portions at the extremities of the bale compartments, transverse bars secured to the outer end portions of said movable portions and having their outer ends off-set, rods passed through the off-set ends of said bars, other bars mounted upon the upper ends of the rods, springs mounted upon the rods and confined between the outer ends of the said bars, set nuts fitted to the upper ends of the said rods, a plunger arranged within the baling chamber and adapted to reciprocate across the feed opening thereof, a slide arranged below the baling chamber and the said platforms and having connection with the lower end of the said plunger, and means for imparting a reciprocating movement to the said slide.

In testimony whereof I affix my signature in presence of two witnesses.

THEODULE GUIDRY. [L. S.]

Witnesses:
A. T. RICHARD,
HOMER BAROUSSE.